July 24, 1951  R. E. QUILLIN ET AL  2,561,993
WEDGE POWER MIXING VALVE
Filed Jan. 16, 1947  3 Sheets-Sheet 1

Inventors
Robert E. Quillin
Donald Coulter
C. J. Callaghan.
BY Wilfred E. Lawson
Attorney July 24, 1951 R. E. QUILLIN ET AL 2,561,993
WEDGE POWER MIXING VALVE
Filed Jan. 16, 1947 3 Sheets-Sheet 2

Inventors
Robert E. Quillin
Donald Coulter
C. J. Callaghan
BY
Attorney

Inventors
Robert E. Quillan
Donald Coulter
C. J. Callaghan.
BY Wilfred E. Lawson
Attorney Patented July 24, 1951

2,561,993

UNITED STATES PATENT OFFICE 2,561,993

WEDGE POWER MIXING VALVE

Robert E. Quillin, Hilliards, Donald Coulter, Reynoldsburg, and Cornelius James Callaghan, Columbus, Ohio Application January 16, 1947, Serial No. 722,346

5 Claims. (Cl. 277—18)

Our invention relates to multiple valves and more particularly to mixing valves for selectively discharging either hot or cold water and for discharging varying combinations of hot and cold water into either a shower head or into a tub, sink, spray, or the like.

Heretofore valves of this type usually have heads which are turned into engagement with the valve seat by a slow-turning screw and with each turning and seating of the valve, wear from friction requires frequent replacement of washers to prevent leaking from the water discharge outlet. In a multiple valve, it is difficult to determine whether the cold or hot water valve is leaking without taking out both valves, so as to inspect the washers. It is an object of our invention to provide a novel valve construction, so as to eliminate such frequent washer replacement and to thereby provide a substantially "trouble-free" valve arrangement by the provision of a valve which exerts no friction on the valve stem or seat in opening or closing the valves in the mixing chamber.

Another object is to provide a novel valve lever control arrangement using no slow-turning screw actuators with the valve stems suspended between the leverage and water pressure when in operation, whereby there is a more rapid control of the valves than with screw actuators.

A further object is to provide a lever operated valve control wedge arrangement, operable by a minimum of exertion and particularly in comparison with the usual slow-turning screw-operated valves.

With the foregoing and other objects in view, the invention will be more fully described hereinafter, and will be more particularly pointed out in the claims appended hereto.

In the drawings wherein like symbols refer to like or corresponding parts throughout the several views, Figure 1 is a cross section view of our invention taken from front to back of the valve housing.

Figures 1, 2:
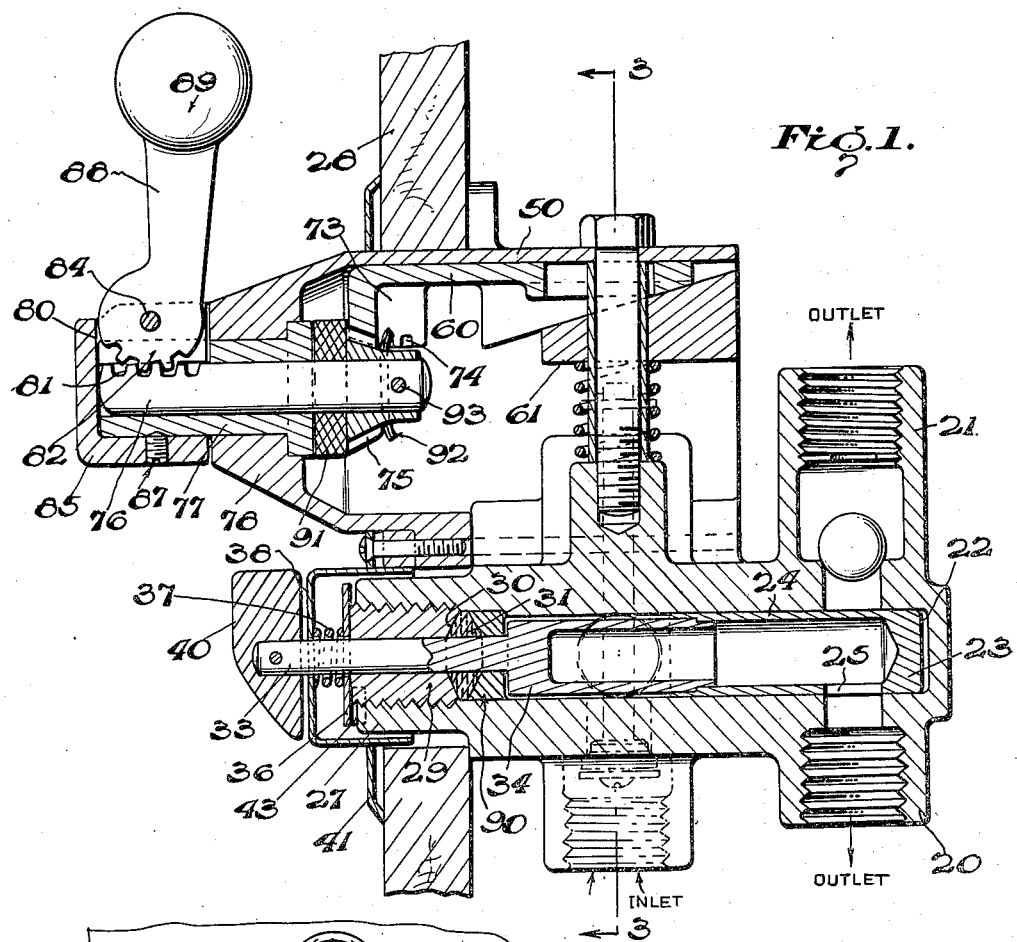
Figure 2 is a front plan view of a wall and the valve actuating levers which extend therethrough from the valve housing in neutral position.
Figure 3:
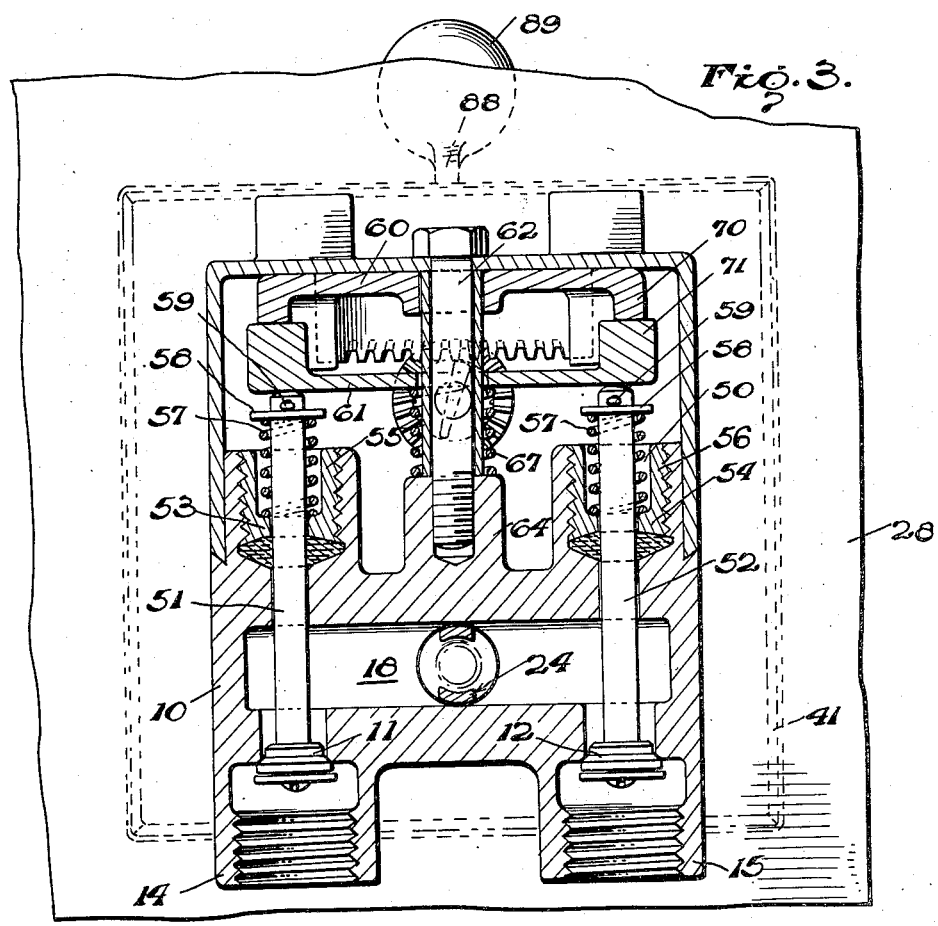
Figure 3 is a cross section view taken along the line 3—3 of Figure 1.

Referring to the drawings and first with particular reference to Figures 1 and 3, our device comprises a housing 10 in which are mounted two valves 11 and 12 for controlling the hot and cold water inlets 14 and 15 respectively.

The inlets connect into a mixing chamber 18 in the housing 10, which chamber connects with outlets 20 and 21 at the rear end thereof. In the rear wall of the chamber 18 is an annular socket 22 in which is rotatably mounted the closed end 23 of a hollow sleeve 24. This sleeve 24 has an opening 25 in one wall adapted to align with one or the other of the outlets 20 or 21, outlet 20 connecting with a bathtub or the like, not shown, and outlet 21 connecting with a shower head or the like not shown. The front wall of the chamber 18 has a small opening formed therein which opens into a centrally located internally threaded nipple 27. The nipple 27 is long enough to extend from the outer surface of the front wall of chamber 18 to the exterior of the wall 28 of a bathroom or the like. An externally threaded plug 29 is provided having a central opening therethrough and a flaring end 30 facing the bottom of the nipple 27, and the flared end of a packing gland stop collar 90, which is positioned by a shoulder in the bottom of nipple 27, so as to provide a space for packing 31.

A shaft 33 extends from a pronged actuator 34 through the opening in the front wall of chamber 18, a stop collar 90, the packing space and packing 31, the plug 29, a lock plate 36, a coiled spring 37 and a cap 38 into a handle 40.

The cap 38 is mounted around the nipple 27 in an escutcheon plate 41 on the exterior of the bathroom wall 28. This cap is held in position by handle 40 and the coil spring 37 compressed between the underside thereof and the top of lock plate 36 which is urged into engagement with ends of nipple 27 and the plug 29. The surface presented to the underside of the lock plate 36 by the nipple and plug contains four recesses 90° apart to receive a locking lug 43 formed from the underside of said plate 36 to provide packing gland adjustment and prevent loosening of packing when 40 is turned from one position to another. Cap 38 is to provide a finished exterior beyond escutcheon plate.

Mounted above the housing 10 is a second housing 50 into which extends the valve stems 51 and 52 through packing glands 53 and 54, respectively. The center plug of each packing gland 55 and 56 is counterbored to serve as a socket for a coiled spring 57, which is coiled around the end of each valve stem. One end of these springs seats on the bottom of the counterbored part of the plugs 55 and 56 and the other end is in engagement under a washer 58 held on the end of each valve stem by a cotter pin 59. Thus the springs 57 normally tend to close the valves 11 and 12 and the water pressure also tends to urge the valves to closed position.

Our novel valve actuator for the hot and cold water valves 11 and 12, comprises a pair of centrally apertured plates 60 and 61, one mounted above the other on a bolt 62. This bolt is threaded into an internally threaded nipple 64 centrally mounted in the top wall of the mixing chamber 18 between the packing glands 55 and 56, from which the ends of the valve stems 51 and 52 extend into close proximity to the bottom face of the lower plate 61 when in a neutral or non-valve-actuating position. The upper plate 60 has its central aperture in the form of a slot.

Mounted between the bottom face of the plate 61 and the top edge of the nipple 64 is a coiled spring 67. The spring 67 is normally expanding to yieldably urge the plate 61 in constant engagement with the upper plate 60. The plate 60 is prevented from any vertical movement on the sleeve 66 as its top flat surface is stopped by the top wall of the second housing 50, only the head of the bolt extending beyond this top wall.

Figure 7:
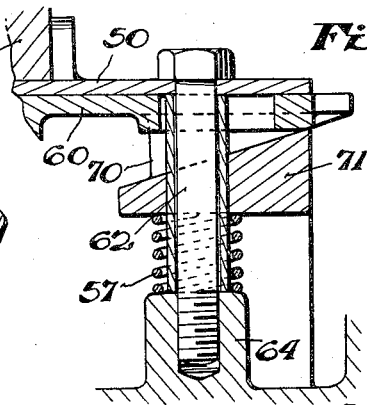
Figure 7 is a partial view in cross section of the wedge actuators.

Each plate 60 and 61 has curved opposed raised cam edges 70 and 71 which are wedge-shaped in cross section, as shown in Figures 1 and 7, so the high point of each upper curved wedge or cam edge is adjacent the low point of each lower curved wedge or cam edge. Each plate 60 and 61 is specially formed to provide for either selectively opening the valves 11 and 12 or for opening both of the valves at like or at different extents, to thereby control the feeding and mixing of the hot and cold water to the tub or the shower or the like. For example, the lower plate 61 has its central opening around the sleeve 66 large enough to permit the same to tilt, to thereby press down on the end of one valve stem more than the other when moved out of a neutral position by the upper plate 60. Also, varying degrees of the tilting angle are provided as the upper plate 60 is mounted to turn with respect to the lower plate, thus displacing the angular position of the curved wedges and by moving the plate 60 along its center slot there is a lineal displacement.

This compound directional displacement of the curved wedges or cams is possible as the upper plate 60 is provided with an annular depending skirt segment 73 having gear teeth 74. The teeth 74 are in mesh with a pinion gear 75 keyed to the end of a shaft 76.

The shaft 76 is mounted to rotate or reciprocate in a bearing sleeve 77 having a shoulder pressed against a thrust collar 91, see Fig. 1, which sleeve interfits in the bore of a conical extension 78 of the second housing 50. This extension 78 extends through the wall plate 41 beyond the exterior of the wall, and the end of the bearing sleeve 77 and the shaft 76 extend beyond the end of extension 78. The bearing sleeve has a longitudinal slot 80 along the end exposed outside of the conical member 78 to expose a plurality of rack teeth 81 on the shaft 76. In mesh with the teeth 81 is a gear 82 pivoted on a pin 84 mounted transverse a slot in an end cap 85, which slot is aligned with slots 80 in the sleeve 77. The cap 85 is held fixed to the end of the bearing sleeve 77 by a set screw 87.

The gear 82 is a segment gear with an upwardly projecting handle 88 having a knob 89 marked with directional arrows pointing to the right, left and forward, so as to indicate "Cold," "Hot" and "Mix."

Figure 4:
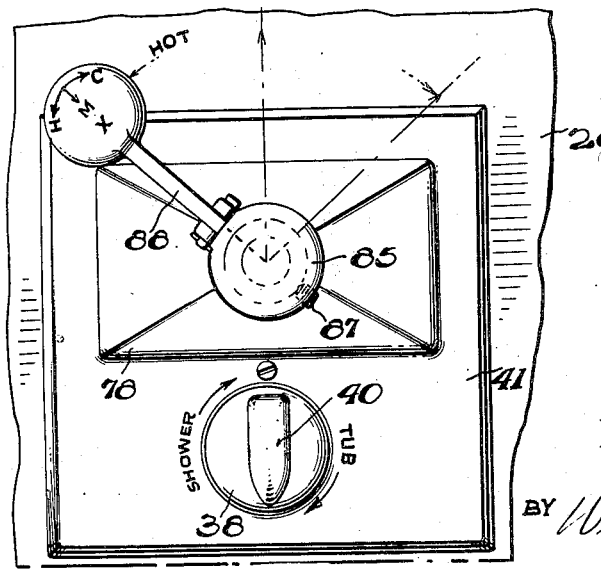
Figure 4 is a view like Figure 2 with the actuating lever moved from neutral position so as to supply hot water to the tub.

In operation, for example, Figure 2 shows the handle in neutral position, and Figure 4 in "Hot" position. With handle 88 mounted in the cap 85 and sleeve 77, when the same is pulled to the left as in Figure 4, the bearing sleeve and shaft are turned together and likewise the pinion gear 75. Pinion 75 being in mesh with the curved segment and its teeth 74 on the plate 60 cause it to turn and angularly change the neutral position of the wedges 70 and 71 on the plates 60 and 61 to open the hot water valve 11. If turned to the right the same action occurs between the wedges but on the opposite side, to thereby open the cold water valve 12.

Figure 5:
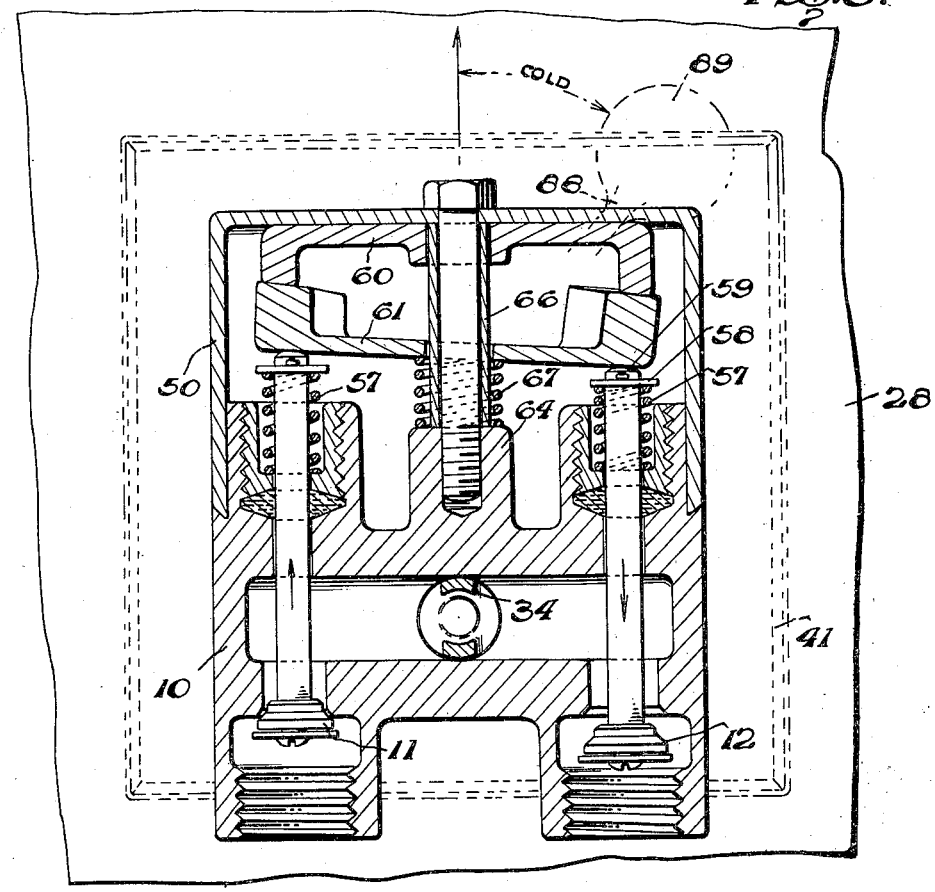
Figure 5 is a cross section view like Figure 3 showing the operating wedge turned to position for supplying cold water to the shower or tub according to the setting of the lever for controlling the shower or tub feed.
Figure 6:
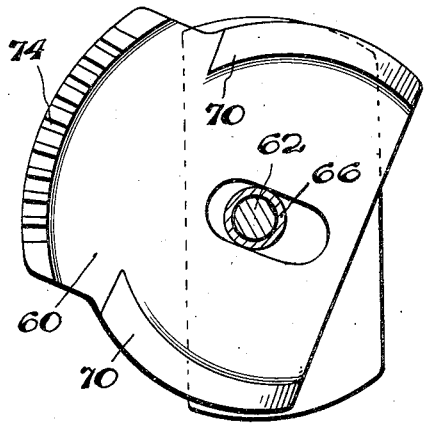
Figure 6 is a bottom view of the top wedge plate for controlling the valves.

If, on the other hand, a mixture is desired— warm water—the handle 88 is pulled outwardly from the wall 28 and the gear 82 moves shaft 76 forward through the bore of the bearing sleeve 77, so that the collar 91, shown in Figure 1 against the shoulder on shaft 76, presses against skirt segment 73 and moves the top plate 60 forward over bolt 62. Such movement of plate 60 causes the under wedge surfaces 70 of the plate to slide over the top wedge surface 71, to thereby push down on the top ends of the hot and cold water valves 11 and 12 evenly to give a warm water supply to either the shower or the tub or the like. To change the temperature, move the lever to left or right while the same is still pulled forward. For example, if moved to the right with the lever in forward position the wedges are angularly displaced, so that the cold water valve 12 is opened wider than the hot water valve 11, see Figure 5. To close, the valve lever 88 is moved to neutral position by pressure of cupped washer 92 which fits on sleeved end of pinion 75 and held in position by pin 93, against skirt segment 73.

Thus we have provided a long-wear, quick-acting valve and a novel single lever control for actuating the hot and cold water supply valves either selectively or in varying degrees of combinations to obtain any water temperature desired.

Although we have illustrated and described our invention in considerable detail, it is to be understood that other combinations and arrangements of the several parts, which now may be made by others skilled in the art, are likewise to be construed as part of this invention. To determine the scope of the invention, reference should be had to the appended claims.

What is claimed as new is:

1. In a water mixing system for supplying hot and cold water from a housing having hot and cold water inlets connecting with a mixing chamber, a valve for each inlet, each valve having a reciprocable stem, an outlet from said mixing chamber, a pair of wedge members each operatively coupled with a stem and supported for movement therewith in the opening and closing movements of the valves, a second pair of wedge members each in wedging engagement with a wedge member of the first pair, means supporting the second pair of wedge members for both rectilinear and rotary movement as a unit with respect to and while in wedging engagement with the first mentioned wedge members, and means for effecting selective rotational and rectilinear movement of the second pair of wedge members.

2. In a water mixing system for supplying hot and cold water from a housing having hot and cold water inlets connecting with a mixing chamber, a valve for each inlet, each of said valves having a reciprocable stem, an outlet from said mixing chamber, a pair of wedge members each operatively coupled with a stem and supported for movement therewith in the opening and closing movements of the valves, a second pair of wedge members each in wedging engagement with a wedge member of the first pair, each pair of wedge members being carried upon a plate and said plates being disposed one above the other, means of supporting the plate and the wedge members of the second pair for both rectilinear and rotary movement with respect to and while in wedging engagement with the first mentioned wedge members, one of said plates including an arcuate toothed rack, a shaft extending into the housing from outside a wall, a pinion gear on the shaft in mesh with the teeth of said rack, and handle means on said shaft for turning said pinion and rack to thereby turn and position the plate and wedge members of the second pair with respect to the wedge members of the first pair to actuate said valves.

3. In a hot and cold water system for selectively discharging hot or cold water and varying combinations thereof, actuating means for at least two valves having elongated stems supported for reciprocal movement, comprising a pair of centrally apertured plates disposed one above the other and above said stem, a bolt passing through the apertured plates, the lower plate engaging the valve stems, the aperture of the upper one of said plates being a slot to permit sliding movement thereof and the aperture of the lower plate being of a size to permit tilting movement thereof, curved wedges carried by each plate, said wedges of the lower and upper plates contacting each other at their high and low points respectively, and means for selectively rotationally and reciprocably moving the upper plates so as to change the relative positions of the high and low points of each two contacting wedges to thereby depress said valve stems and actuate the said valves.

4. In a hot and cold water system for selectively discharging hot or cold water and varying combinations thereof, actuating means for at least two valves having elongated stems supported for reciprocal movement, comprising a pair of centrally apertured plates disposed one above the other and above said stems, a bolt passing through the apertured plates, the lower plate engaging the valve stems, the aperture of the upper one of said plates being a slot to permit sliding movement thereof and the aperture of the lower plate being of a size to permit tilting movement thereof, curved wedges carried by each plate, said wedges of the lower and upper plates contacting each other at their high and low points respectively, a shaft rotatably and slidably mounted for connection with the upper one of said plates, an arcuate toothed rack carried by the upper one of the plates, a pinion mounted on one end of said shaft and having toothed connection with said rack, rack teeth formed in the other end of said shaft, a gear in mesh with said shaft teeth, a cap rotatably mounted on the said other end of the shaft, said gear being pivotally mounted in said cap, and a handle connected with said gear adapted to be swung in arcs at right angles to each other to impart both turning and sliding movement through said shaft to the upper one of the said plates.

5. In a hot and cold water system for selectively discharging hot or cold water and varying combinations thereof, actuating means for at least two valves having elongated stems supported for reciprocal movement, comprising a pair of centrally apertured plates disposed one above the other and above said stems, a bolt passing through the apertured plates, the lower plate engaging the valve stems, the aperture of the upper one of said plates being a slot to permit sliding movement thereof and the aperture of the lower plate being of a size to permit tilting movement thereof, curved wedges carried by each of said plates, said wedges of the lower and upper plates contacting each other at their high and low points respectively, a shaft rotatably and slidably mounted for connection with the upper one of said plates, an arcuate toothed rack carried by the upper one of the plates, a pinion mounted on one end of said shaft and having toothed connection with said rack, rack teeth formed in the other end of said shaft, a gear in mesh with said shaft teeth, a cap rotatably mounted on the said other end of the shaft, said gear being pivotally mounted in said cap, a handle connected with said gear adapted to be swung in arcs at right angles to each other to impart both turning and sliding movement through said shaft to the upper one of the said plates, and a knob on the end of said handle having handle direction movement indications thereon for predetermining valve positions whereby selective or varying combinations of hot and cold water are obtainable by movement of the handle.

ROBERT E. QUILLIN.
DONALD COULTER.
CORNELIUS JAMES CALLAGHAN.

REFERENCES CITED

The following references are of record in the file of this patent:

UNITED STATES PATENTS

| Number | Name | Date |
| --- | --- | --- |
| 1,095,003 | Leonard | Apr. 28, 1914 |
| 1,573,210 | Whidden | Feb. 16, 1926 |
| 1,641,561 | Whidden | Sept. 6, 1927 |
| 1,845,627 | Rosewood | Feb. 16, 1932 |
| 1,856,380 | Foster | May 3, 1932 |
| 2,322,157 | Porter | June 15, 1943 |